United States Patent [19]

Komanduri et al.

[11] Patent Number: 5,014,581

[45] Date of Patent: May 14, 1991

[54] APPARATUS FOR MACHINING

[75] Inventors: Ranga Komanduri, Arlington, Va.; Branimer F. von Turkovich, Jericho, Vt.; Morton P. Casey, Jr., W. Sand Lake, N.Y.

[73] Assignee: The United States of America as represented by the Secretary of the Air Force, Washington, D.C.

[21] Appl. No.: 378,746

[22] Filed: Jul. 12, 1989

[51] Int. Cl.$^5$ .............................................. B23B 27/12
[52] U.S. Cl. ........................................ 82/173; 82/158; 407/7; 384/108
[58] Field of Search ........................ 82/1.11, 173, 147; 407/7, 11; 384/100, 101, 102, 107, 108, 121, 610, 110

[56] References Cited

U.S. PATENT DOCUMENTS

| | | | |
|---|---|---|---|
| 2,551,167 | 5/1951 | Rolland | 29/96 |
| 2,645,534 | 7/1953 | Becker | 384/107 |
| 2,651,223 | 9/1953 | Hahn | 77/58 |
| 2,663,977 | 12/1953 | Gerard et al. | 51/100 |
| 3,578,232 | 5/1971 | Loyd et al. | 228/2 |
| 3,732,757 | 5/1973 | Cottin | 82/2 |
| 3,801,165 | 4/1974 | Lombard | 384/100 |
| 4,223,580 | 9/1980 | Sidorenko et al. | 82/36 R |
| 4,547,081 | 10/1985 | Tanaka et al. | 384/121 |

Primary Examiner—Frederick R. Schmidt
Assistant Examiner—Keating Johns
Attorney, Agent, or Firm—William E. Auton; Donald J. Singer

[57] ABSTRACT

A rotary machining system is presented which uses a housing, a combined spindle and cutting disk, a source of high pressure fluid, a hydraulic line, a needle valve, a carbide ball and a carbide socket to machine superalloys and other difficult-to-machine materials and alloys at high speeds. The hydraulic lines and fluid source provide high pressure fluid through an aperture of the carbide socket into the housing to float the spindle. This fluid acts as a hydrostatic thrust bearing as it separates the spindle from the walls of the housing. Since the spindle and cutting disk are a single unit which are not physically attached to a roller bearing mechanism, they may be quickly and easily inserted and removed to minimize the "down time"0 of the system when the cutting disk needs to be replaced or ground to a sharp edge.

2 Claims, 3 Drawing Sheets

APPARATUS FOR MACHINING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to rotary machining tools, and more specifically to a rotary turning apparatus used for machining superalloys and other difficult-to-machine metals and alloys at high speeds.

With the need to increase machining speed for improving productivity and reducing procurement costs, tool wear becomes a critical factor limiting productivity. This is especially important when machining materials for aerospace application such as titanium alloys, nickel base superalloys and steel alloys used in gun barrels, e.g., AISI 4340. The majority of tool materials react with the specified work materials; and as speed is increased (in the conventional speed range), tool-chip interface temperatures increase rapidly and this additionally aggravates the chemical interactions between the tool and the chip, leading to rapid tool wear. In order to achieve reasonable tool life between regrinds or insert changes, especially at high cutting speeds, it is necessary to come up with an innovative way of prolonging tool life. Development of new tool materials that can resist wear when machining these materials at high speed is one obvious approach, and tool manufacturers are continuously working towards this goal. However, since no such tool material is currently available, innovative methods have to be devised that will permit the use of conventional tool materials and also provide a decrease in the wear rate or an increase in the tool life. Some of the methods by which this objective can be accomplished are:

effective cooling of the tool by reducing the rate of increase of the chip-tool interface temperature;

providing a continuous (or infinite) cutting edge; an effective contamination of the chip tool interface to reduce chemical interactions.

Rotary cutting tool machining appears to be one promising method for achieving the objectives. It is basically a cutting process in which a fresh portion of the cutting edge is fed continuously to the cutting zone in addition to normal feed and depth of engagement (or cut).

A rotary tool is a cutting tool with a circular cutting edge that rotates about its own axis, either self propelled by the cutting process or driven externally at the desired speed. The cutter is attached to a spindle that rotates between suitable bearings. As cutting progresses, new portions of the cutting edge are continuously brought in contact with the workpiece at the cutting zone. Representative examples of rotary tool systems are disclosed in the following U.S. Patents, the disclosure of which are incorporated herein by reference:

U.S. Pat. No. 2,551,167 issued to Rolland;
U.S. Pat. No. 2,651,223 issued to Hahn;
U.S. Pat. No. 2,663,977 issued to Gerard et al.
U.S. Pat. No. 3,578,232 issued to Loyd et al.
U.S. Pat. No. 3,732,757 issued to Cottin; and
U.S. Pat. No. 4,223,580 issued to Sidorenko et al.

The patent to Rolland has been selected to illustrate a rotary cutting tool of the general class discussed in the present. The reference Hahn has been selected to show that use of a single spherical ball to receive axial thrust loads in a cutter is well known in the art. The references Gerald et al. and Loyd et al. have been included for their showing of the use of high pressure hydraulic fluid in connection with high speed rotating spindles but neither singly nor jointly do they suggest the present invention's use of high pressure fluid. The reference Cottin is of interest in its showing of use of hydraulic fluid in high speed rotary machine tool. The patent of Sidorenko is of interest and has been included as possible background information in the rotary cutting art.

While the above-cited references are instructive, rotary machining systems have some inherent problems. For example, the need to increase machining speeds to improve productivity and increasing use of superalloys for aerospace applications are imposing severe restrictions on the potential life of a cutting tool. Generally, the cost of an insert is only a small fraction (often times negligible) of the total cost. Considerable non-productive time, such as the insert changing time and/or tool regrinding time, is involved.

In view of the foregoing discussion, it is apparent that there currently remains the need for an improved rotary machining system which will increase the life of the tool between insert changes. The present invention is intended to satisfy that need.

SUMMARY OF THE INVENTION

The present invention includes two separate but related constructions for rotary cutting tools for high speed machining of superalloys and other difficult-to-machine material's in aerospace applications. In one arrangement, an inverted T-shaped carbide spindle/cutter combination floats on a high pressure fluid. In a second arrangement, the inverted spindle/cutter is supported on a single, centered, hardened carbide ball and socket in addition to a controllable, high pressure fluid.

As described above, the present invention includes an apparatus for machining that increases the life of a tool considerably, between insert changes, based on a rotary tool machining concept. A typical rotary tool cutting system consists of a round tool insert mounted on a spindle that rotates about its axis in a set of bearings. The bearings support the radial and the thrust loads subjected during machining. However, the bearings have limited life and limited speed and load capacities. This invention eliminates the use of conventional bearings and a separate spindle. Instead, the cutting insert is shaped in such a way as to act as a disposable insert/spindle. The load-carrying capacity is provided by supplying high pressure fluid that separates the spindle and the housing. Such a set-up can be considered as a tapered, cylindrical, hydrostatic thrust bearing.

Note that when the loads of a rotary cutting tool are supported by high pressure fluid which is flowing between the spindle and the housing, the accuracies of the spindle need not be high. More importantly, since the spindle is not physically fixed to a bearing it is easily removeable from the housing when a change is required. The present invention will minimize the "down time" of rotary tool systems since the time to change the cutter is reduced. This minimization of the "down time" is derived from two characteristics of the invention. First, the spindle and cutter disk are one unit, and is easier to remove than an insert with two separate elements would be. Second, since this insert is be a free-floating unit that is not physically fixed to the housing, the ease of inserting it and removing it from the housing is greatly increased. The present invention is used as a self-propelled rotary tool system. Rotary drive systems are not used to turn the spindles. The spindles are rotated by the movement of the workpiece being machined.

It is an object of the present invention to provide a rotary cutting tool for high speed machining of superalloys and other difficult-to-machine materials.

It is another object of the present invention to provide a rotary cutting tool with a cutter which may be quickly inserted and removed when a change is required.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a high speed rotary cutting system.

This application discloses an improvement for the system of U.S patent application Ser. No. 07/213,670, filed June 30, 1988 by Ranga Komanduri.

Figure 1:
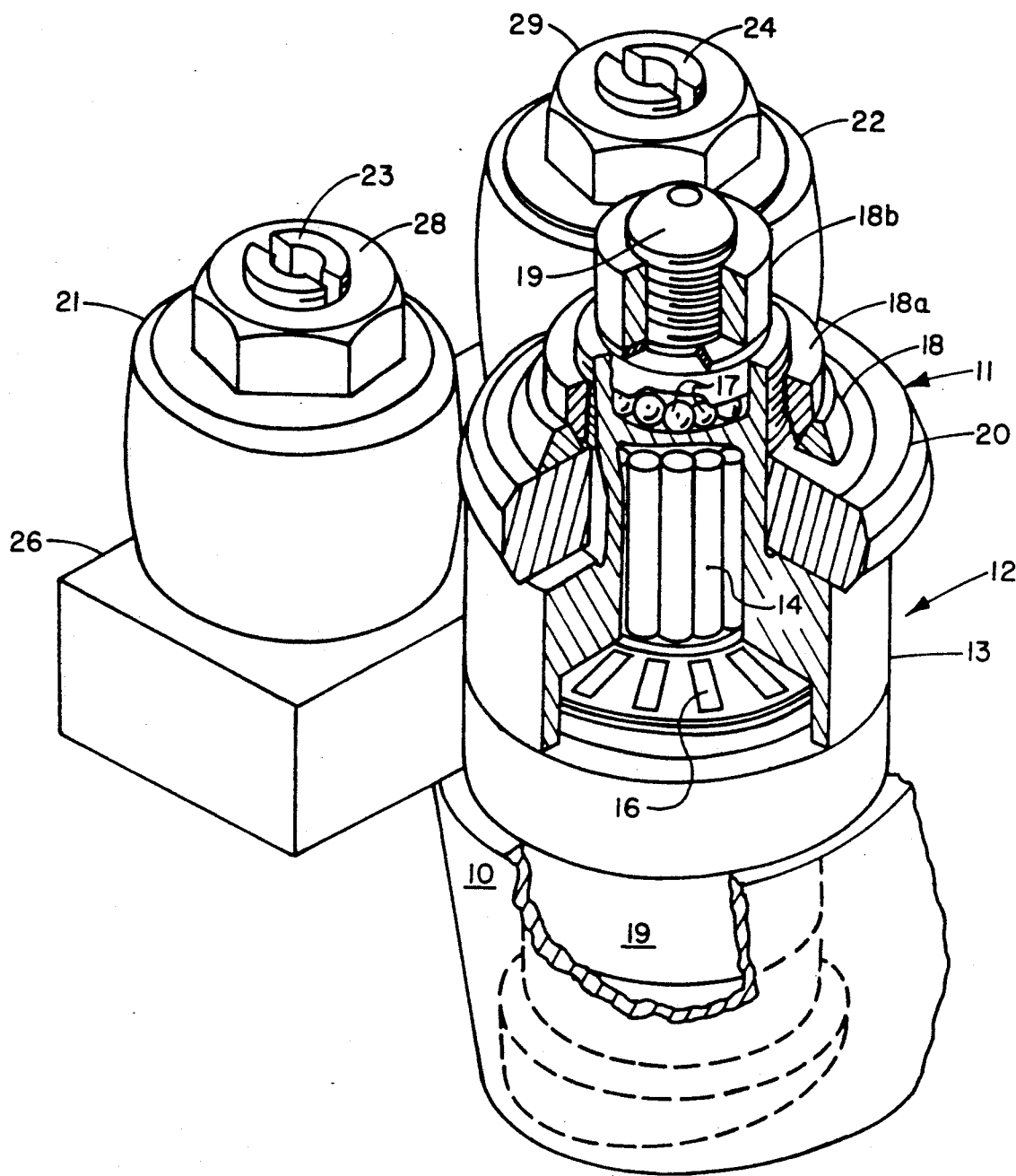
FIG. 1 is an enlarged view of the rotary cutting system of the below-cited Komanduri reference.

The reader's attention is now directed towards FIG. 1, which is an enlarged view of the rotary cutting system of the above-cited Komanduri reference. The purpose of FIG. 1 is to depict details of the features that the present invention shares with prior art system.

The rotary cutting tool apparatus 12 is mounted on a tool shank 10, one end of which is adapted to be secured in a tool post, or other support, of a machine tool. The opposite end of the shank 10 supports the rotary cutting tool apparatus and presents the cutting disc 11 into machining contact with a workpiece.

Cutting disc 11 is part of the rotary cutting tool assembly 12 which typically comprises a housing 13, needle bearings 14, thrust bearings 16 and ball bearings 17. This assembly of parts (in addition to retaining washers 18, nut 18A and threaded collar 18B) fits over and around a spindle, and is supported by the spindle 19. The spindle is supported by the tool shank 10 and is held in place by a fastener 19A and spacer 19B. The spindle 19 is held by the shank 10 while the several bearings permit rotation of the cutting disc 11.

A pair of cam followers 21, 22 are mounted on a support bracket 26 on shank 10 to provide dynamic stiffening of the rotary cutting assembly The cam followers are rotatably mounted on the shank 10 with cam shafts 23 and 24, which are oriented paralled to the spindle 19. Shafts 23 and 24 are repositionable and are spaced from each other such that a line extending diametrically from the cutting area passes therebetween. This is the optimum location for the dynamic stiffening means since the resultant force the cams provide directly opposes the cutting forces on the cutting disc 11. Cam shafts 23 and 24, projecting off-center from supporting cylindrical bases, extend upward through cam followers 21 and 22 which, in turn, are firmly fixed to the tool support bracket 26 by nuts 28 and 29. By rotating cylindrical bases (not shown) in their sockets in bracket 26 the cam shafts (23, 24) and cam followers (21, 22) can be moved towards or away from assembly 12. These features are discussed in greater detail in our U.S. Pat. No. 4,515,047. The eccentric offset of the cam shafts can be determined by the tool design as long as provision is made for adjustability.

Cam followers 21, 22 are brought into contact with the cutting disc assembly 12 with the degree of preloading desired by adjusting the location of cam shafts 23 and 24. Cam followers are commercially available with integral eccentric studs or without studs for shaft mounting. Either construction is available with a slight barrel shape as shown here. These cam followers have the design capability of withstanding up to 1660 lbs. of dynamic radial force. The contact of cam followers 21, 22 at their outer periphery with the cutting disc assembly 12 is along a circle on disc 11 in order to minimize the net load encountered during machining that causes deflection of the spindle 19. Once positioned, the cam followers are kept in place by tightening nuts 28 and 29.

The cutting disc insert 11 of the system of FIG. 1 has an improved tool geometry. The shape of the cutting edge of a tool is more critical for tool performance of rotating tools than with stationary round tools. This is because the metallic chip that is generated during the machining of a work piece slides past the rake face 30 of the rotary tool in a tangential direction; periodic grooving of the clearance face 31 of the tool is commonly observed. This grooving not only reduces tool life but also results in an inferior finish on the machine surface of the workpiece. Such grooving further results in high stresses and offers significant resistance to tool rotation so that the tool resists rotation during cutting.

This chamfer lowers tool stress by permitting the metallic chip to glide on the tool face without damaging it and results in significant improvements in tool life. Since the rotary cutter can rotate at reasonably high speeds (up to 2000 rpm) during a rotary tool machining, both concentricity and accuracy of the cutter are critical. Tolerances of better than +0.002 inches and more preferably +0.0005 inches are found to yield chatterless machining.

Figure 2:
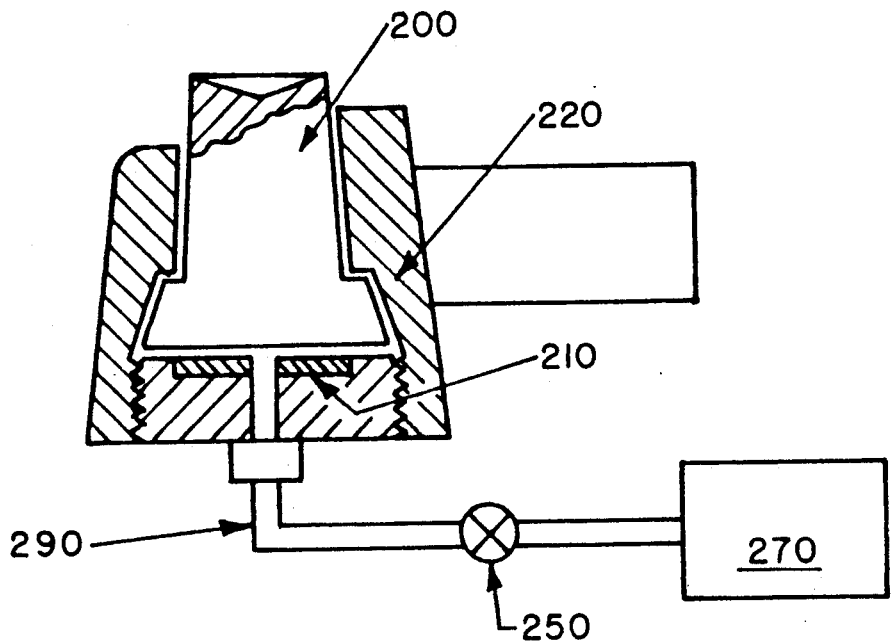
FIGS. 2 and 3 are schematics of the rotary cutting system of the present invention.
Figure 3:
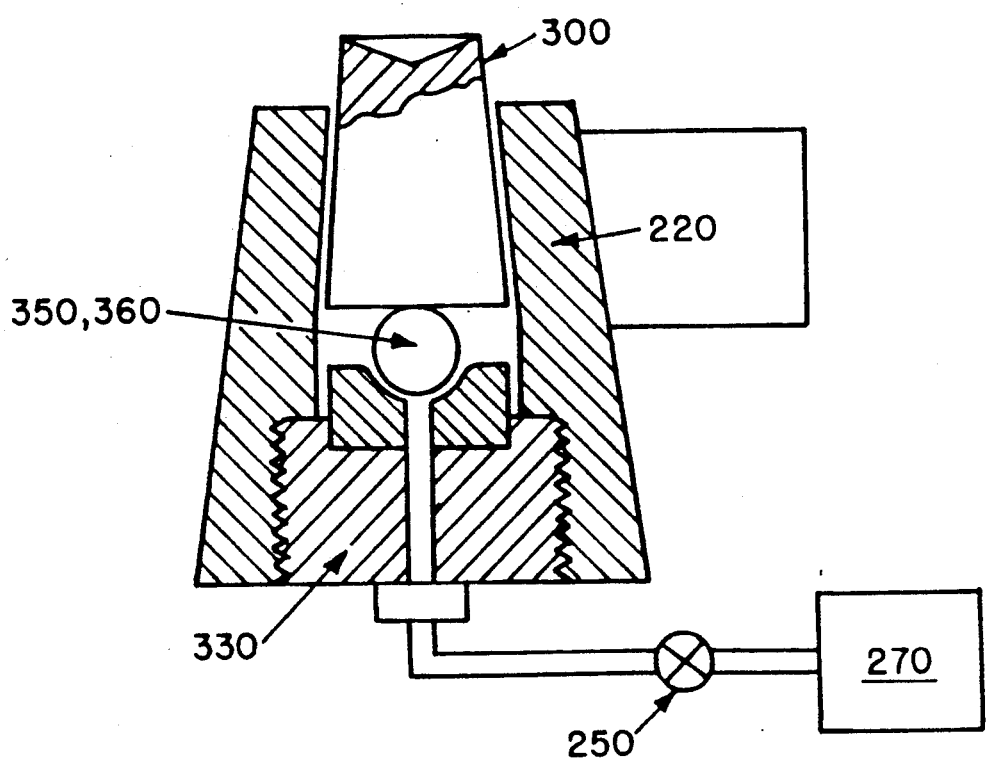

The system of FIGS. 2 and 3 is useable for high speed machining of super alloys and other difficult-to-machine materials. The term "high speed" is generally as designated below in Table 1, which defines five cutting speeds.

TABLE 1

| Cutting speed Classification | Range sfpm |
| --- | --- |
| Low speed, conventional | 100 |
| Industrial speeds | 100-2000 |
| High speed, (mainly in aluminum alloys) | 2000-6000 |
| Very-high-speed | 6000-60,000 |
| Ultra-high and ballistic speeds | 60,000-600,000 |

The term "high-speed machining" is a relative one from a materials viewpoint because of the vastly different speeds at which different materials can be machined with acceptable tool life. For example, it is easier to machine aluminum at 1800 surface meters per minute (smm) [6000 surface feet per minute (sfpm)] than titanium at 180 smm (600 sfpm). As will be seen later, a definition of HSM can be provided in terms of chip morphology characteristics of a given material and its properties. While attractive from a concise technical standpoint, this is not very useful as a practical definition. For this reason, it is generally preferable to define machining speeds quantitatively in terms of specific ranges.

The highest practical cutting speed for most metals is limited by the availability of a cutting tool material that will last over a sustained period at that speed. In general tool life decreases rapidly with increasing cutting speed. At very high cutting speeds tools often last only a fraction of a second. Therefore, the mechanisms of tool wear have been intensely studied by many industrial as well as academic researchers whose ultimate goal is to improve productivity by extending tool life at high cutting speed. The detailed process by which cutting edge fails during machining is extremely complex and no one simple wear mechanism can explain the observed tool wear process. Instead, the tool edge wear is dependent upon many factors such as the particular combination of workpiece and cutting tool materials or the specific cutting conditions. However, our current knowledge of tool wear mechanisms is insufficient to make reliable a priori predictions of cutting tool performance under given machining conditions.

The reader's attention is now directed towards FIG. 2, which is a schematic of the rotary cutting system of the present invention. The system of FIG. 2 includes a disposable carbide spindle/cutter 200 which rotates on a carbide washer 210 inside on a housing 220. In FIG. 2, the spindle and cutter are a single unit that has to be reground periodically. This combined spindle and cutter is an insert that is similar in shape to the one that is used in Carboloys' Tee Lock Tool insert except the insert is used upside down. In FIG. 2, since the loads are supported by high pressure fluid flowing between the spindle and the housing, the accuracies of the dimensions of the rotating spindle and its housing need not be high. The high pressure fluid enters the housing 220 from the central aperture of the carbide washer 210 with a pressure that is controlled by the needle valve 250. The fluid is contained in the area immediately surrounding the spindle 200. The needle valve is in turn connected with a high pressure oil or water soluble oil emulsion source 270. This high pressure fluid source is a discharge pump that provides the hydraulic lines with a pressurized stream of fluid with pressures of about ten thousand psi or higher if necessary. The result is a rotary spindle insert 200 which has an adjustable pressure supporting it rather than conventional bearings. In this manner, the rotating spindle insert floats on the high pressure fluid in the housing. Since the insert simply floats (instead of being fixed to a roller bearing) it is easier to change when required.

As mentioned above, a typical rotary tool cutting system consists of a round tool insert mounted on a spindle that rotates about its axis in a set of bearings. The bearings support the radial and the thrust loads to which the insert is subjected during machining. However, the bearings have limited life and limited speed and load capacities. This invention eliminates the use of conventional bearings and a separate spindle. Instead, the cutting insert is shaped in such a way as to act as a disposable insert/spindle. The load-carrying capacity is provided by supplying high pressure fluid that separates the spindle and the casing. Such a bearing can be considered as a tapered, cylindrical, hydrostatic thrust bearing.

In the system of FIG. 2 the number of elements in the system are considerably reduced. Also, cemented carbide has a modulus nearly three times that of steel, a fact which translates into an increase in stiffness of the system and a decrease in manufacturing cost. The performance of such a simple system should be more foolproof than that of a similar system using conventional bearings. Even if the loads are high and are not adequately supported by the fluid pressure, no serious damage to the system will occur. While a spherical bearing, i.e., the spindle shaped in the form of a sphere, might perform better than the present tapered cylindrical, hydrodynamic bearing in terms of load bearing capability in different directions (i.e., radial and axial), the manufacturing costs associated with the former would very high. Also, products of various sizes can be introduced by applying the teaching of the present invention based on geometric similarity. The load and speed capabilities, as well as the life of this system, are not as limited as that of a system with conventional bearings. Furthermore, higher stiffness and reduction in the number of moving parts make the system less prone to vibration—a serious limitation of systems using just conventional bearings.

FIG. 3 is a schematic of another arrangement of the rotary turning system of the present invention. In this arrangement, the tapered spindle 300 is supported on a hard sphere 350 which acts as a hydrostatic ball bearing. The sphere 350 can be made of hardened steel, cemented carbide or other suitable material. This will enable a better flow and control of the fluid in the housing. The sphere 350 in turn can be supported on a cemented carbide or hardened steel ring 360. A portion of the fluid used for load support can also be made available to the cutting process as a lubricant/coolant. This will serve to cool the insert cutter 300, and to wash away the debris from the workpiece.

Figure 4:
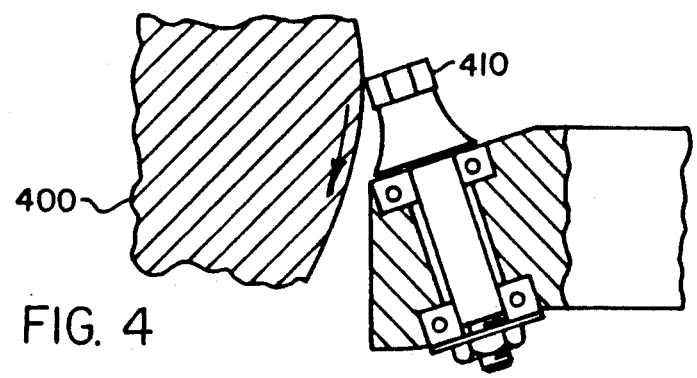
FIG. 4 is an illustration of a self-propelled rotary system.

The system of FIGS. 2 and 3 is used as a self propelled rotary tool (SPRT). Driven rotary tools (DRT) make use of a rotary drive system to rotate the cutter. FIG. 4 is a self propelled rotary system which relies on the motion of the workpiece 400 to propel the rotary tool cutter 410 without the use of a rotary drive connected to the cutter. Similarly, the use of high pressure hydraulic fluid systems is disclosed in the above-cited Gerard et al., Loyd et al., and Cottin patents, and not be redescribed in detail.

With DRT orthogonal or oblique machining can be accomplished. Also, the cutter can rotate in the same direction or opposite the cutting velocity vector. In addition, the c can rotate at any desired velocity (up to several times the cutting speed). In contrast, the SPRT can rotate only in one direction and at one speed relative to the cutting speed. Thus, although the SPRT does not require a separate drive, DRT offers a wide choice of conditions, some of which can leads to decreased cutting forces, increased shear angle, increased tool life, and better finish. For example it has been found that by increasing the ratio of cutter velocity to cutting velocity from 1 to 500, the forces decrease rapidly to a very low value. Also, the frictional conditions on the rake face can be altered similarly by varying the cutter speed and its direction of rotation.

The innovative design of the carbide spindle/cutter design lies in the following features. First, when the oil pressure in the bottom of spindle balances exactly the cutting pressure on top of the spindle, there is an uninterrupted passage of oil by Hagen-Poisseville flow around the spindle from the reservoir 270. This oil could be used as a lubricant for the cutting process. The flow Q is given by the following equations:

$$Q = -\frac{\pi}{8mv} \frac{d}{dl}(p + h\gamma)a^4 - b^4 - \frac{(a^2 - b^2)^2}{\ln a/b} \quad (1)$$

where;
- a is the average inner diameter of the annular passage;
- b is the average outer diameter of the annular passage;
- mv is the viscosity of oil;
- $\gamma$ is the density of the oil;
- $\rho$ is the pressure; and
- h is the head.

The term $$\frac{d}{dl} \cdot (p + h\gamma)$$

is the pressure gradient which could be effectively approximates by $$\frac{\Delta p}{\Delta l}$$

where l is the length of the spindle

Since $\Delta p \approx p$ the pump pressure and we see that the term in the square bracket is linearly proportional to $\delta = a - b$.

The entire formula reduces to:

$$Q = \frac{\pi \rho \delta b}{4\mu}[2b^2 - 1] \quad (2)$$

The spindle vertical travel is equal to:

$$lv = \frac{\delta}{\sin\alpha} \quad (3)$$

where $\alpha$ is the semi cone angle.

All this means that the spindle can oscillate vertically whenever there is an imbalance between the cutting pressure and the pump pressure. One could design a control system such that the pump pressure drops sharply when Q approaches zero, or is zero since you could operate on the relationship
Q=(a constant )$p \times \delta$
which is easy to regulate because:
Q=(constant ) $\rho \cdot l_v \sin \alpha$,
which corresponds to a pop - up valve controller When ever there is a flow Q, the spindle will rotate because of chip action on its top (or on the insert mounted on the top).

One could claim that the spindle rotates and oscillates vertically by a type of ratchet motion.

Figure 5:
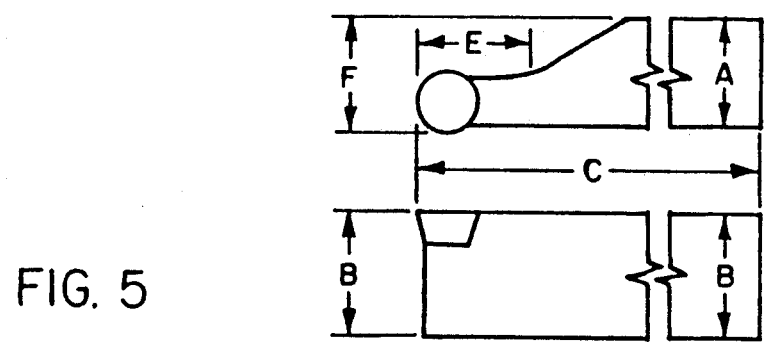
FIGS. 5-7 are illustrations of commercially—available shanks that may be used as the spindle and cutting disk of the present invention.
Figure 6:
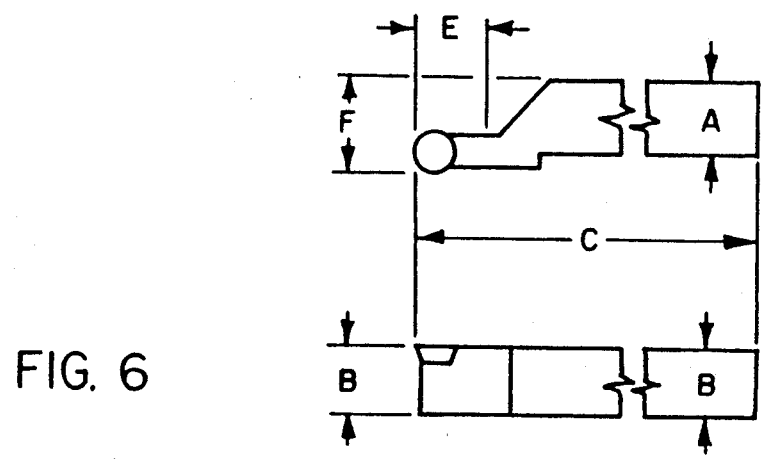
Figure 7:
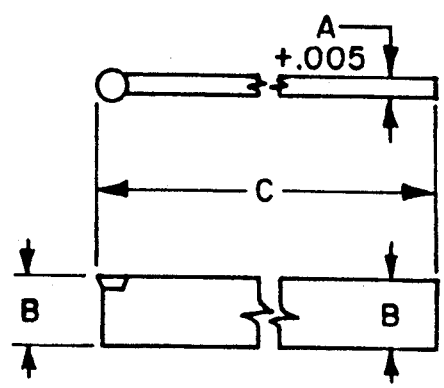

As mentioned above, the combined spindle and cutter of FIGS. 2 and 3 is similar in shape as that used in Carboloy's Tee Lock Tool holders. FIGS. 5-7 are plan views of styles A, G, an O rounds respectively of the Tee Lock Tool holders produced by Carboloy Systems. The characters A-F in FIG. 5-7 are the dimensions of the rounds, and are listed below in Tables 2, 3 and 4.

TABLE 2

ROUND STYLE A DIMENSIONS
BASIC
DIMENSIONS IN INCHES

| A | B | C | E | F |
|---|---|---|---|---|
| 1 | 11/4 | 6 | .77 | 1.014 |
| 1 | 11/4 | 6 | .77 | 1.020 |
| 1 | 11/4 | 8 | 1.03 | 1.030 |
| 1 | 11/4 | 8 | 1.03 | 1.038 |

TABLE 3

ROUND STYLE G DIMENSIONS
BASIC
DIMENSIONS IN INCHES

| A | B | C | E | F |
|---|---|---|---|---|
| 3/4 | 3/4 | 41/2 | .76 | 1.000 |
| 1 | 1 | 6 | .76 | 1.250 |
| 11/4 | 11/4 | 7 | .76 | 1.500 |
| 11/2 | 11/2 | 7 | .76 | 1.200 |

TABLE 4

ROUND STYLE O DIMENSIONS
BASIC
DIMENSIONS IN INCHES

| A | B | C | E | F |
|---|---|---|---|---|
| .156 | 3/4 | 4 | — | — |
| .218 | 3/4 | 4 | — | — |
| .312 | 1 | 4 | — | — |
| .437 | 1 | 4 | — | — |

A commercial rotary tool system cannot afford to be complex and expensive unless it can be justified fully by its performance. This is especially true with a new, unconventional system, generally making it difficult for such a system to be accepted on the shop floor. To simplify the design and construction of a rotary turning system, this invention minimizes the number of parts and relaxes the accuracies normally demanded by a typical system incorporating conventional bearings.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A rotary cutting tool for use in machining a workpiece and which is driven by motion of said workpiece, and which comprises:
   a housing which has sides and a top and a bottom;
   a spindle which is rotated in said housing by said workpiece, said spindle being attached a one end to a rotatable cutting disk which extends out of the top of said housing to machine said workpiece;
   a means for providing a high pressure fluid into the bottom of said housing and around the spindle to separate the spindle from the bottom and the sides of the housing, said providing means adjustable providing said high pressure fluid at adjustable pressures, said providing means thereby causing said spindle and said cutting disk to float on said high pressure fluid in said housing during operation, and allowing the spindle and cutting disk to be quickly and easily removed from the housing when required;

a socket which is fixed to the bottom of said housing, said socket having a central aperture through which said providing means sprays said high pressure fluid into said housing, said socket having a curved indentation which surrounds said central aperture; and a ball which rests on said curved indentation of said socket between said spindle and said socket, said ball thereby allowing said spindle to rotate on said ball as a hydrostatic ball bearing when said rotary cutting tool is in use.

2. A rotary cutting tool, as defined in claim 1, wherein said providing means comprises:

a source of high pressure fluid, said source outputting a stream of said high pressure fluid at pressure of about 10,000 psi;

a hydraulic line which connects said source with the bottom of said housing to supply said high pressure fluid thereto; and a needle valve which is fixed in said hydraulic line and which adjusts the pressure of said high pressure fluid at a range extending between 0 and 10,000 psi.

* * * * *